United States Patent
Rosen et al.

(10) Patent No.: US 8,346,395 B2
(45) Date of Patent: Jan. 1, 2013

(54) SHIP RUDDER CONTROL (AUTOPILOT) WITH A CAN BUS

(75) Inventors: Wolfgang Rosen, Schoenberg (DE); Norbert Pedersen, Kiel (DE); Michael Wessel, Kiel (DE)

(73) Assignee: Raytheon Anschuetz GmbH, Kiel (DE)

( * ) Notice: Subject to any disclaimer, the term of this patent is extended or adjusted under 35 U.S.C. 154(b) by 687 days.

(21) Appl. No.: 12/568,274

(22) Filed: Sep. 28, 2009

(65) Prior Publication Data
US 2010/0082873 A1 Apr. 1, 2010

(30) Foreign Application Priority Data
Sep. 26, 2008 (DE) .................. 10 2008 049 126

(51) Int. Cl.
*G05B 13/00* (2006.01)
*G05D 1/00* (2006.01)

(52) U.S. Cl. ............. 700/275; 701/21; 114/144 RE; 114/162

(58) Field of Classification Search ......... 700/19, 700/275; 114/144 R, 144 RE, 162, 330; 701/1, 21, 41; 244/175, 194, 195, 221; 710/313
See application file for complete search history.

(56) References Cited

U.S. PATENT DOCUMENTS

| | | | |
|---|---|---|---|
| 6,687,579 B2 * | 2/2004 | Thompson et al. | 701/21 |
| 6,860,452 B2 * | 3/2005 | Bacon et al. | 244/194 |
| 7,258,072 B2 * | 8/2007 | Wong et al. | 114/146 |
| 2003/0089291 A1 | 5/2003 | Kanno et al. | |
| 2005/0252433 A1 * | 11/2005 | Gai | 114/144 R |

FOREIGN PATENT DOCUMENTS
DE 196 25 561 1/1998
DE 10 2004 041 824 3/2006
* cited by examiner

*Primary Examiner* — Charles Kasenge
(74) *Attorney, Agent, or Firm* — Diederiks & Whitelaw, PLC

(57) ABSTRACT

Ship rudder control, so-called autopilot, includes a multiplicity of components connected with a bus interface to a CAN bus and via this also to each other. A further bus interface on each component of the control system is coupled to a separate, second bus, with the components being provided with unambiguous addresses and further information being assigned that mark the components as monitorable or non-monitorable. A device for emitting telegrams of component addresses and monitorability. A first comparator on all monitorable components start or switch off their own property as a monitoring component using the addresses of other components in received telegrams by comparison, and a second comparator on all monitorable components that use the number of received telegrams by comparison with the number of telegrams received on the other channel causing a change of the channel to that with the higher number of received telegrams under certain circumstances.

12 Claims, 2 Drawing Sheets

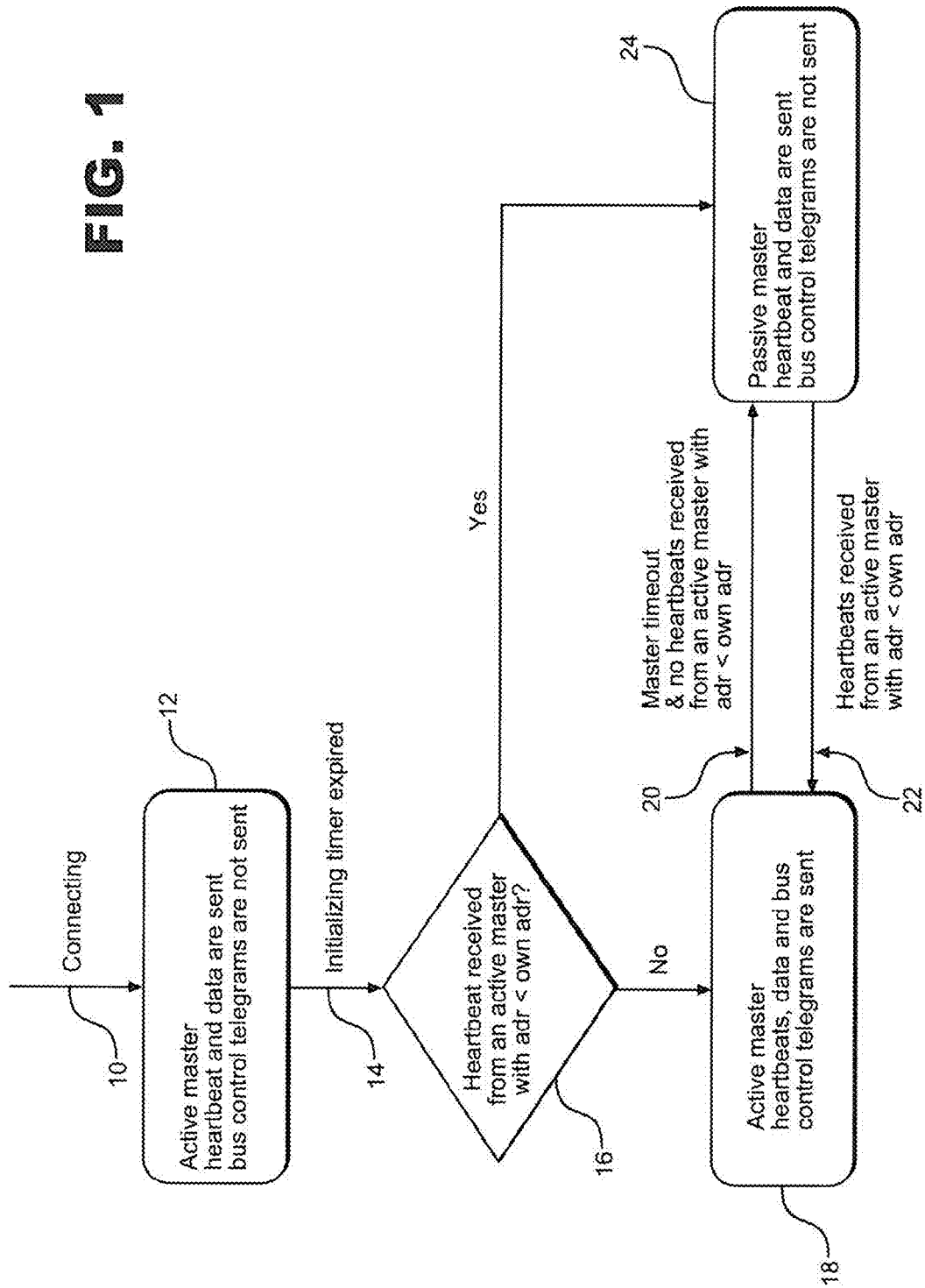

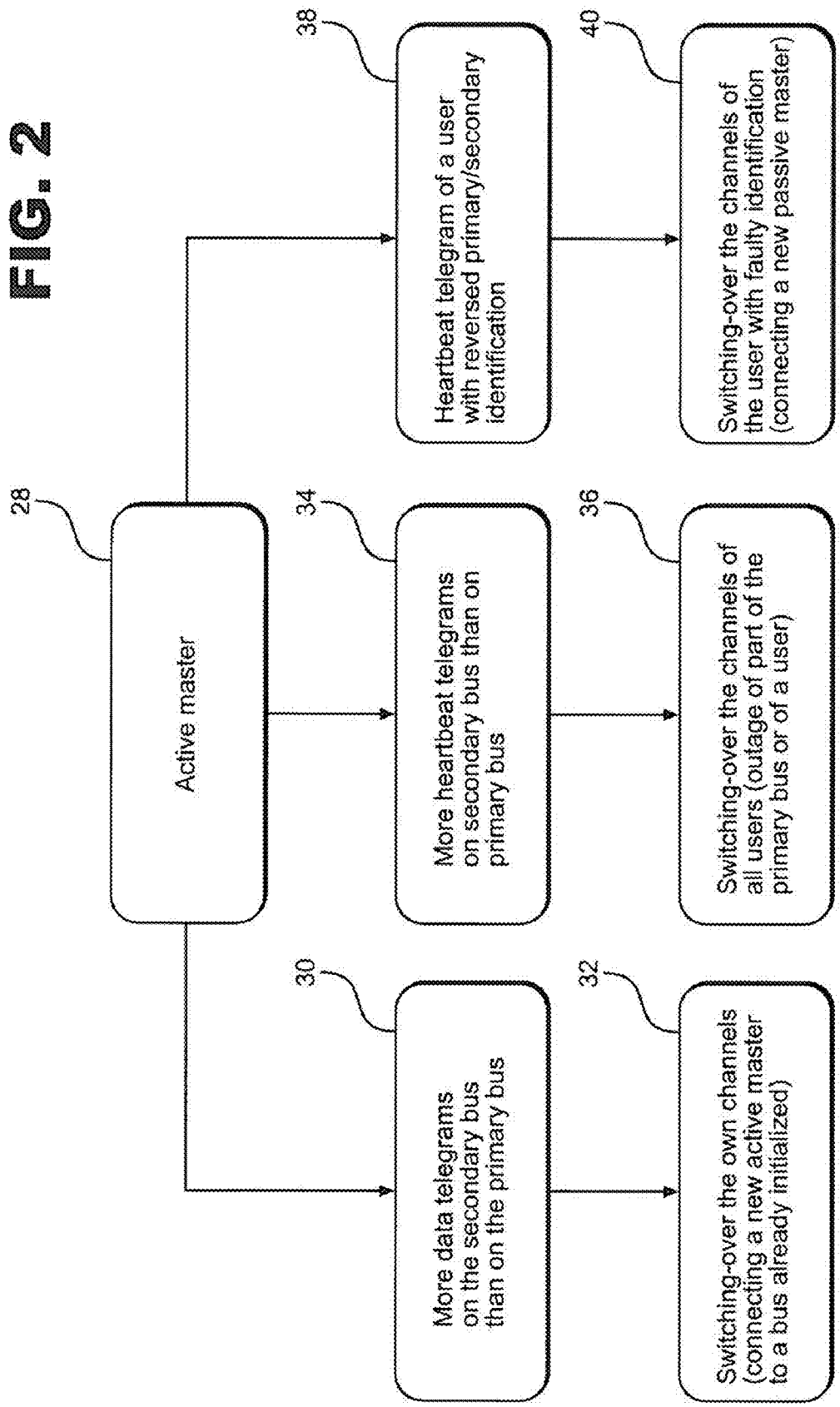

SHIP RUDDER CONTROL (AUTOPILOT) WITH A CAN BUS

BACKGROUND OF THE INVENTION

The invention relates to a ship rudder control, a so-called autopilot, having a plurality of electronic components that are connected to each other by means of a CAN bus. Due to the enormous importance that the correct rudder position and also its indication to a skipper possesses, there are several copies of sensors, position encoders, and display instruments on all ships.

When using electronic components with a CAN bus, as is customary in automotive engineering, there is the problem that outages of single components are often due to poor functional capability of a bus interface or the cabling or the plug connection of the electronic component to the bus. The effects of such fault events are to be minimized as far as possible.

The bus can further be damaged in its property as data line, it being possible for this damage even to be the reception of an unwanted signal, that is to say this damage may be present only temporarily. So as to avoid that such a bus fails in its entirety despite this, a redundancy through an alternate path has to be provided.

Using two data buses simultaneously is however associated with a very substantial overhead in terms of information transmission, that in particular again is a stress on the bus interfaces.

SUMMARY OF THE INVENTION

The invention is therefore based on the object of providing a redundancy for the case of malfunctions, this however without unnecessarily inflating and complicating the data transmission. Components that are disturbed only temporarily are to be operated further/again for the case that they function.

According to the invention, this is solved through a ship rudder control. It is preferable that a second CAN bus is provided essentially identical to the first one and each electronic component is provided with two bus interfaces, so that use of either one or the other bus is possible.

The decision of which bus to use has now to be made in a suitable manner. In this respect, there are no suggestions in the prior art, since the CAN bus system is designed with the goal of working without master and slave with a multiplicity of components which have absolutely identical rights. However, the invention now proposes to exchange signals between the individual components on the two bus channels only in the style of telegrams (that is without large amounts of data, namely short), at least addresses of each electronic component being present in these telegrams, the addresses identifying the component uniquely and that also have not been assigned twice.

A further bus interface on each component of the control system, that is coupled to a separate, second bus, is used to likewise transmit—as on the first bus—so-called heartbeat telegrams, the telegrams of respective components being provided with unique addresses, and further information is assigned to the components and inserted into the telegrams that characterize them as monitorable or as non-monitorable.

A component has further a device for emitting heartbeat telegrams to all (other) components that transmit, in addition to the address of the component, also the monitorability or the non-monitorability and that are further arranged for the reception of signals from other components on both CAN buses and for outputting their control information on the one or the other CAN bus, first comparison means on all monitorable components that start or switch off their own property as a monitoring component using the addresses of other components in the received heartbeat telegrams by comparison, and second comparison means on all monitorable components that, using the number of received heartbeat telegrams by comparison with the number of heartbeat telegrams received on the other channel, cause a change of the channel to that with the higher number of received telegrams, a channel change command being only transmitted if the component has determined itself previously to be an active monitoring component by activating the second comparison means by activity of the first comparison means.

By simply comparing the address signals, a component can now take the decision of which of the two buses is to be used. For example, that component with the lowest address (e.g. the lowest bit value) can be selected as a monitoring component. In this way the decision of which channel of the two or more available CAN buses is to be used, can be delegated to a component, so as to avoid contradictory information being transmitted. How this component communicates with the other components, is explained below in more detail.

It is pointed out that it is not necessary for each component of the CAN bus system to be selectable as a monitoring component. A simple sensor, although it brings its data to the CAN bus, but does not contain any further logic, can be characterized in its address telegram as "not suitable for monitoring". For this purpose, those electronic assemblies that however can carry out such a monitoring, possess a comparison circuit that allows them to compare addresses and to decide whether their own address is higher or lower than that of all received telegrams. Precisely that one electronic assembly that recognizes itself as the lowest addressed unit during these comparisons, now transmits an altered telegram, after which it assumes the function as the monitoring component and decides which bus is to be used.

Since there can be cases in which the monitoring component is newly added into a system that is already running, there can be cases in which another component that previously served as the monitoring component, now terminates its activity and possibly switches over to the channel that is pre-specified by the new monitoring component.

On the other hand, it can also be that the monitoring component recognizes, even if it is for example set to Channel 1 and all other components already communicate with each other on Channel 2, that Channel 2 is used by the system that has been running so far, and will therefore set itself to Channel 2.

It is pointed out that only so-called heartbeat telegrams with the telegram addresses on both channels are exchanged, while the actual function values of the ship rudder control are exchanged only on one channel. In such a ship rudder control the number of components that are connected to the bus system can very well be a 3-digit one.

Further features of the invention result from the following description of a preferred exemplary embodiment.

In the process, in particular the sequence is illustrated when a component leaves the system, that is, it no longer sends correct data, a bus interface is faulty, or the cable to the interface is no longer fully functional or a new component is added that for example is not suited to be selected as a monitoring component.

BRIEF DESCRIPTION OF THE DRAWINGS

FIG. 1 shows an illustration of the sequence that is effective when connecting, and FIG. 2 is a sequence diagram how, starting from the monitoring component, more data telegrams are achieved, more heartbeat telegrams are achieved and what is done in the case of a user with a reversed primary/secondary identification.

DETAILED DESCRIPTION OF THE INVENTION

The bus system that is to ensure the redundancy of the data transmission within a ship rudder control system via a CAN bus, will thus exhibit in each case two identical bus interfaces. According to the state of the system, one user assumes the monitoring function, that is to say, the monitoring function is not firmly coupled to one user. The two bus channels have a fixed designation on each connected node: the so-called channel number Channel 1, Channel 2.

These channel numbers are assigned in the software (or by configuration in a service mode (in no case in the user mode), one hardware interface receiving the designation Channel A, and the other is Channel B. The choice, which two hardware interfaces are interconnected, is free. It is possible to set up several instances of the Advanced Redundancy Dual Bus within software. Both channels have a defined channel status: Primary Channel or Secondary Channel. These two items of status information are also transmitted in a heartbeat telegram, that is to say, the two heartbeat telegrams that are each transmitted on the Primary Channel and on the Secondary Channel, thus have different contents!

Thus always all data are transmitted on the Primary Channel. Only the heartbeat telegrams are transmitted on the Secondary Channel, or those telegrams that are still necessary for managing the redundancy.

Heartbeat telegrams are transmitted on both channels, in each case with different features, for example whether it is the Primary Channel or the Secondary Channel. The initialization of the two channels are identical. The users of the Advance Redundancy Dual Bus are classified as active monitoring components and passive monitoring components and non-monitorable components. These are marked in the heartbeat telegram.

An active monitoring user is for example that one with the lowest address from the monitoring users. It monitors the bus and causes the switching over. Designated below as AUET. A passive monitoring (monitorable) user is then that whose address is higher than that of the active AUET. It also monitors the bus, but cannot cause the switching-over, but can assume the active monitoring function at any time in case it should fail. In the following it is designated as PUET. Passive, non-monitorable users that cannot assume or take over the monitoring function are mostly present, but are not necessary.

During the boot operation, all users will transmit heartbeats with their identification on their primary and secondary channel. In this case, for example when switching on, Channel A can be the primary channel, and Channel B can be the secondary channel.

Each user compares the received heartbeats with its own address. If the received address is lower, the corresponding users change their identification and become the passive user PUET. In this way, one AUET is left over. This process takes approximately 5 heartbeat intervals.

During this time, data is already being transmitted by the users. Each user establishes the amount of data on each channel. The remaining active monitoring AUET now decides which channel is the primary one. The criteria for this are:

1. Amount of Data

In the case of a heartbeat difference equal 0, the channel having the largest amount of data becomes the primary channel, because it makes sense to switch as few data as possible.

2. Difference of the Heartbeats.

If there is more data on Channel A and the heartbeat difference is 0, then Channel A is the Primary Channel.

If there is more data on Channel B and the heartbeat difference is 0, then Channel B is the Primary Channel.

If there is more data on Channel A but fewer heartbeats, then Channel B becomes the Primary Channel.

If there is more data on Channel B but fewer heartbeats, then Channel A becomes the Primary Channel.

If there is more data on Channel A and more heartbeats, then this remains the Primary Channel. If the amounts of data are identical on both channels and the heartbeat difference is 0, then Channel A remains the Primary Channel.

Connecting Up a User with a Lower Address than the Present AUET:

The new AUET recognizes that it will become the new AUET and communicates its AUET status on the bus. Then the previous AUET changes into the PUET status.

Connecting Up Other Users as Non-Monitorable Units, Slave Units (or Passive Monitoring Units), that is to Say Addresses Higher than that of the Present Auet:

The new monitorable user checks the bus for a present AUET and assumes the PUET status.

The AUET checks the heartbeats of this newly connected user and causes the correct connecting to the bus of this instrument.

Monitoring of the buses is therefore carried out according to the invention by means of short (so-called heartbeat) telegrams.

In the process, each user cyclically transmits a heartbeat (e.g. each second) on the two channels, the Primary Channel and the Secondary Channel. After the boot operation, the user having the lowest address has the active monitoring function and is the AUET.

The number of heartbeats on each bus is monitored by each user. But only the AUET acts. If heartbeats are missing on the primary channel, an error counter counts upwards. The AUET checks whether the error counter is incremented continuously in a specific time. If this is the case, then there is a switchover to the other channel by means of a control telegram. The data traffic now takes place on this channel and is now the new Primary Channel. The time from the occurrence of the error case until the switching over is 3-5 heartbeat intervals. During this time, a loss of data occurs. In the case of a completely disturbed bus, this is valid for all users. If only a few users are disturbed, then only they experience a loss of data.

In summary, this means that after a switching-over of the channels has taken place due to an error case in a channel or also a switching-over forced from the outside (e.g. by service intervention/integration test/ . . . ), following is triggered:

The Primary Channel becomes the Secondary Channel.

The previous Secondary Channel becomes the Primary Channel.

The data traffic now takes place on the "new" Primary Channel.

Only heartbeats are transmitted on the "new" Secondary Channel.

There is only a switch-back when there is a new heartbeat difference. The physical allocations Channel A and Channel B remain and accordingly never change!

The comparison of the addresses and the AUET status is carried out by each user even after booting. As a result, in the case of an outage of an AUET, a new AUET can control the Advanced Redundancy Dual Bus switching-over. Because, if the AUET fails, all PUET become AUET for a brief period, until the AUET having the lowest address has been found. The other users then again switch'into the state PUET.

In FIG. 1, after a connecting operation that is marked by the reference numeral 10, the active AUET (reference numeral 12) will send heartbeats and data and will initially transmit no bus control telegrams. After an initializing timer has expired at reference numeral 14, the decision is taken (reference numeral 16) whether the heartbeat is received by an AUET having an address that is smaller than the own address.

When this is the case, the first comparison means are guided to the PUET 24 (arrow Yes), whereupon further heartbeats and data are transmitted, but still no bus control telegrams are transmitted. If, however, the decision is "No", the AUET will send also bus control telegrams in the field 18 in addition to the heartbeats and data. At the reference numeral 20 it is shown how an AUET time-out takes place if no heartbeats are received by the AUET with an address none of the own address. The reference numeral 22 shows that the heartbeats are received by an AUET with an address smaller than the own address, so that a switching-over between active and passive AUET and PUET is suppressed for the time being.

In FIG. 2, an AUET 28 will be able to carry out three different operations. If in field 30, more data telegrams are recognized on the secondary bus than on the primary bus, then in field 32 the switching-over of the own channels takes place (connecting a new active AUET to a bus that has already been initialized). In the intermediate strand, more heartbeat telegrams can be received on the secondary bus than on the primary bus. After this, a switching-over of the channels of all users takes place (the outage of part of the primary bus or of a user is assumed). Finally, even heartbeat telegrams of a user with a reversed primary/secondary identification can appear in the right-hand branch. Then a switching-over of the channels of this user with a faulty identification takes place (this is the case of connecting a new passive element). This switching-over is caused in that the monitoring component transmits a corresponding control telegram to the passive component.

The invention claimed is:

1. A ship rudder control system including a multiplicity of components that are connected with a bus interface to a CAN bus and to each other comprising:
a further bus interface on each component of the control system that is coupled to a separate, second bus, the components being provided with unambiguous addresses, and further information being assigned to the components that mark the components as monitorable or non-monitorable,
at least one device for emitting telegrams to all components that transmit, in addition to the address of the components, also the monitorability or the non-monitorability and that are arranged for the reception of signals from other components on the CAN bus and for outputting control information on at least one of the CAN bus and the second bus, and
first comparison means on all monitorable components that start or switch off their own property as monitoring component using the addresses of other components in the received telegrams by comparison,
second comparison means on all monitorable components that use the number of received telegrams on a channel by comparison with the number of telegrams received on another channel to cause a change of the channel to that with the higher number of received telegrams,
a channel change command being only transmitted if the component has determined itself previously to be an active monitoring component by activating the second comparison means by activity of the first comparison means.

2. The ship rudder control system according to claim 1, wherein the second bus is identical to the CAN bus.

3. The ship rudder control system according to claim 1, wherein all of the components are monitorable.

4. The ship rudder control system according to claim 1, wherein only two of the components are monitorable.

5. The ship rudder control system according to claim 1, wherein the bus control and bus connecting telegrams are always transmitted on both channels.

6. The ship rudder control system according to claim 1, wherein the control telegrams for the ship rudder are sent only on the channel that has been recognized by the active monitoring component as the primary channel and reported by means of a telegram.

7. A ship rudder control system comprising:
multiple components each provided with a unique address and assigned information that individually establishes a monitoring status for each of the multiple components as either monitorable or non-monitorable ;
a first bus interface on each of the multiple components coupled to a first, CAN bus so as to establish a first control channel;
a second bus interface on each of the multiple components coupled to a second bus and establishing a second control channel;
at least one device for emitting telegrams to the multiple components on both the first and second channels, with the telegrams including at least the addresses and monitoring status of the multiple components;
a first comparator, provided for each of a first group of the multiple components having a monitorable monitoring status, for causing each of the monitorable components to either establish itself as an active monitoring component or switch off their own property as a monitoring component based on addresses of other ones of the components received in the telegrams; and
a second comparator, provided for the first group of the components, for comparing numbers of received telegrams on the first and second channels to cause issuance of a channel change command to establish a select one of the first and second channels with a higher number of received telegrams as a primary channel, wherein a channel change command is only transmitted if a given component of the multiple components has previously determined itself to be the active monitoring component.

8. The ship rudder control system according to claim 7, wherein the second bus is identical to the CAN bus.

9. The ship rudder control system according to claim 7, wherein all of the components are monitorable.

10. The ship rudder control system according to claim 7, wherein only two of the components are monitorable.

11. The ship rudder control system according to claim 7, wherein the telegrams include bus control and bus connecting telegrams transmitted on both of the first and second channels.

12. The ship rudder control system according to claim 7, wherein the device further emits control telegrams which are sent only on one of the first and second channels which has been recognized by the active monitoring component as the primary channel.

* * * * *